United States Patent
Wiskus

(10) Patent No.: US 12,103,708 B2
(45) Date of Patent: Oct. 1, 2024

(54) AIRCRAFT DOLLY

(71) Applicant: West Metro Aviation, LLC., Buffalo, MN (US)

(72) Inventor: Michael Wiskus, Spring Park, MN (US)

(73) Assignee: Disabled Aircraft Tools, LLC, Spring Park, MN (US)

( * ) Notice: Subject to any disclaimer, the term of this patent is extended or adjusted under 35 U.S.C. 154(b) by 0 days.

(21) Appl. No.: 14/657,911

(22) Filed: Mar. 13, 2015

(65) Prior Publication Data

US 2015/0259077 A1   Sep. 17, 2015

Related U.S. Application Data

(60) Provisional application No. 61/953,773, filed on Mar. 15, 2014.

(51) Int. Cl.
*B64F 1/225*   (2024.01)
*B60P 3/11*   (2006.01)
(Continued)

(52) U.S. Cl.
CPC ............... *B64F 1/225* (2013.01); *B60P 3/11* (2013.01); *B64F 1/22* (2013.01); *B60B 30/02* (2013.01);
(Continued)

(58) Field of Classification Search
CPC .. B64F 1/22; B64F 1/224; B64F 1/225; B64F 1/08; B64F 1/227; B64F 1/226;
(Continued)

(56) References Cited

U.S. PATENT DOCUMENTS

| 834,146 | A | * | 10/1906 | Lewis | ...................... B66F 7/246 |
| | | | | | 414/430 |
| 1,248,896 | A | | 12/1917 | Olson | |

(Continued)

FOREIGN PATENT DOCUMENTS

GB   1105364 A  *  3/1968  ................ B64F 1/22

OTHER PUBLICATIONS

The Brackett Aircraft Company, Inc. [online] "Towbar Model TY-TB-FTD", First accessed on Mar. 3, 2014, Retrieved from the Internet: http://www.brackettaircraft.com/TY-TB-FTDspec.sht.htm, 2 pgs.

(Continued)

*Primary Examiner* — James Keenan
(74) *Attorney, Agent, or Firm* — Christensen, Fonder, Dardi & Herbert PLLC; Douglas J. Christensen

(57) ABSTRACT

A dolly for placement beneath a landing gear of an aircraft that enables transport of the aircraft without rolling the tire of the aircraft. The dolly includes a platform for a tire to rest on and a channel for positioning the tire. The dolly includes a winch for translating the dolly and aircraft tire relative to each other such that the landing gear is brought to rest on the platform, and one or more stops for securing the aircraft landing gear with respect to the dolly. Once positioned, the dolly can be used while transporting the aircraft, either by hand pushing, a hand towbar, a motorized tug with a towbar, or other mode. The dolly is useful for moving aircraft in tight spaces and is also useful for transporting aircraft with damaged landing gear or flat tires.

18 Claims, 11 Drawing Sheets

(51) Int. Cl.
*B64F 1/22* (2024.01)
*B60B 30/02* (2006.01)
*B60B 30/10* (2006.01)

(52) U.S. Cl.
CPC ......... *B60B 30/10* (2013.01); *B60B 2900/115* (2013.01); *B60B 2900/3312* (2013.01); *Y10S 180/904* (2013.01)

(58) Field of Classification Search
CPC . B60B 30/02; B60B 30/10; B66D 2700/0183; B60P 3/11; Y10S 180/904
USPC ........ 180/904; 414/426, 430, 528, 559, 538; 187/217
See application file for complete search history.

(56) References Cited

U.S. PATENT DOCUMENTS

| | | | | |
|---|---|---|---|---|
| 1,419,067 A * | 6/1922 | McCarthy | ............... | B66F 7/246 414/430 |
| 1,751,874 A * | 3/1930 | Moore | ............... | B66F 7/24 187/212 |
| 1,819,625 A * | 8/1931 | Schroeder | ............... | B60P 3/035 414/430 |
| 2,222,111 A * | 11/1940 | McCarthy | ............... | B66F 7/025 187/217 |
| 2,362,981 A | 11/1944 | Baum | | |
| 2,392,409 A | 1/1946 | Ray | | |
| 2,576,544 A * | 11/1951 | Smith | ............... | B66F 7/243 104/44 |
| 2,608,312 A | 8/1952 | Day | | |
| 2,610,750 A * | 9/1952 | Hulbert | ............... | B66F 7/246 414/430 |
| 2,980,270 A * | 4/1961 | Elliott | ............... | B64F 1/22 414/430 |
| 3,024,036 A * | 3/1962 | Reynolds | ............... | B62B 5/0083 414/430 |
| 3,583,723 A | 6/1971 | Nowell | | |
| 3,586,187 A | 6/1971 | Wright | | |
| 3,598,259 A | 8/1971 | Wright | | |
| 3,720,422 A | 3/1973 | Nelson | | |
| 3,946,886 A | 3/1976 | Robinson | | |
| 4,036,384 A * | 7/1977 | Johnson | ............... | B64F 1/227 414/430 |
| 4,212,580 A * | 7/1980 | Fluck | ............... | B60P 3/1058 298/1 A |
| 4,690,605 A | 9/1987 | Coccaro | | |
| 4,854,803 A | 8/1989 | Coccaro | | |
| 4,968,210 A * | 11/1990 | Friederich | ............... | B60P 3/07 414/430 |
| 5,071,151 A | 12/1991 | Irwin | | |
| 5,386,737 A * | 2/1995 | Soeder | ............... | B64F 5/0045 180/904 |
| 5,511,929 A * | 4/1996 | Loftus | ............... | B60P 1/5423 212/180 |
| 6,450,756 B1 * | 9/2002 | Stahancyk | ............... | B64F 1/224 414/426 |
| 7,040,556 B2 * | 5/2006 | Jones | ............... | A01C 17/001 222/610 |
| 7,097,406 B1 | 8/2006 | Gang | | |
| 7,607,608 B2 * | 10/2009 | Morris | ............... | B62B 3/00 244/50 |
| 8,366,373 B2 * | 2/2013 | Wood | ............... | B60P 1/5471 212/175 |
| 8,475,108 B2 | 7/2013 | Hamman | | |
| 8,496,230 B1 * | 7/2013 | Jiron | ............... | B66D 1/28 254/323 |
| 8,534,980 B2 * | 9/2013 | Kuramoto | ............... | B60P 1/5409 212/180 |
| 8,882,434 B2 * | 11/2014 | LaBruyere | ............ | B62B 5/0083 414/426 |
| 2003/0021661 A1 * | 1/2003 | Fluss | ............... | B62B 5/049 414/430 |
| 2014/0037409 A1 | 2/2014 | Winters | | |

OTHER PUBLICATIONS

AIRTUG®, [online] "NFE-4 Aircraft Tug", First accessed on Mar. 3, 2014, Retrieved from the Internet: http://airtug.com/products/aircraft-tugs/the-cirrus-airtug-tug/, 8 pgs.

* cited by examiner

AIRCRAFT DOLLY

CROSS-REFERENCE TO RELATED APPLICATIONS

The present application claims the benefit of U.S. Provisional Application No. 61/953,773, filed Mar. 15, 2014, which is incorporated herein in its entirety by reference.

FIELD OF THE DISCLOSURE

The present disclosure relates to dollies for transporting large vehicles such as aircraft. More specifically, it relates to dollies for transporting aircraft wherein the aircraft's wheel or wheels must not or cannot roll, such as moving an aircraft with a flat tire or in tight spaces.

BACKGROUND OF THE DISCLOSURE

In aviation, certain circumstances arise wherein an aircraft must be moved without rolling on one or more of its tires. One common example is an aircraft disabled by a flat tire. Airplanes are susceptible to flat tires, like all wheeled vehicles. If an airplane tire goes flat while on a taxiway or, worse, on a runway, it can block that thoroughfare. This happens often enough to be, in the best case, a nuisance and, in the worst, a safety hazard. Towing with a flat tire can cause considerable damage to an airplane, which is clearly undesirable. Repairing the tire in-situ is inconvenient and potentially dangerous for the mechanics and for other airport traffic. Usually, part or all of the airport must be closed until the airplane can be cleared. Often, this is an intolerable length of time, especially if the failure must be repaired on an active runway or taxiway. Furthermore, an in situ repair might be impossible, or at least difficult, in inclement weather.

Another example for which an aircraft is moved without rolling on one or more of its tires is when moving it in tight spaces such as a hangar. Hangar space is at a premium, and aircraft are typically tightly packed into hangars. Being able to move an aircraft in any direction, i.e., one not limited by the wheel rolling directions, can be an advantage when moving aircraft.

Wheeled vehicles of all kinds are susceptible to flat tires and other breakdowns, and transport dollies of various designs to move them are known in the art. Representative examples are shown in U.S. Pat. No. 1,248,896 to Olson, U.S. Pat. No. 2,608,312 to Day, U.S. Pat. No. 3,583,723 to Nowell, et al, and U.S. Pat. No. 7,097,406 to Gang.

Moving aircraft on airports is a common occurrence, with numerous commercially available devices being available for doing so. Motorized tugs, for example, are commonplace. These range from massive vehicles for airliners, to walk-along devices for small planes. Some of these attach to a wheel axle of an aircraft, directly or indirectly. Others provide for somehow lifting the subject wheel off the ground. One such device is disclosed in U.S. Pat. No. 8,475,108 to Hamman, and another in U.S. Pat. No. 3,946,886 to Robinson et al. Other dolly devices have been disclosed that may be used for elevating a normal aircraft tire off the ground, allow the wheels of the dolly to roll when moving the aircraft. One such device is shown in U.S. Pat. No. 2,362,981 to Baum. Such devices are designed to move normally-operating aircraft, and are not suited for moving disabled aircraft or for application to main landing gear wheels. Hand- or tug-pulled towbars are also commonplace in the aviation field. Some of these include a lifting apparatus to raise the subject tire off the ground, secondary wheels for ease of transport, or both. An example is shown in U.S. Pat. No. 5,071,151 to Irwin.

Some existing devices provide for transporting disabled aircraft that has a flat tire. One example is disclosed in U.S. Patent Application Publication No. 2014/0037409 to Winters. Another device for transporting disabled aircraft is the Towbar Model TY-TB-FTD, offered for sale by The Brackett Aircraft Company, Inc. of Kingman, Ariz., USA. The Model TY-TB-FTD can be used, according to the company, as a flat tire dolly on either main landing gear or nose gear wheels.

There remains an unmet need for an aircraft transport dolly that can be quickly and safely applied to an aircraft tire and wheel, and can be applied and used by a single operator. A dolly that is simple and fast to apply to the aircraft tire and wheel, that stably secures to tires and wheels of various sizes and configurations, which may or may not be surrounded by fairings, and that can be used both with or without a towbar, including with or without a motorized tug, would be welcomed.

SUMMARY OF THE DISCLOSURE

Various embodiments of the present disclosure include a dolly for use under the wheel of an aircraft. The dolly includes casters so that, once applied, the aircraft can be transported on the casters. The dolly is easily coupled beneath any landing gear tire by use of a winch or other translation method. In one embodiment, the dolly provides retaining features to stabilize a variety of wheel and tire assemblies without damage, including those with fairings. The dolly can be applied from the front or rear of any aircraft tire, and accepts a variety of towbars to allow tug or hand transport of the aircraft. In some embodiments, an aircraft dolly is provided that can be used to advantageously move an aircraft, including in directions other than what the landing gear wheels allow. Various embodiments include a low profile that enables coupling to a wheel that includes a fairing, even where the tire of the wheel is flat.

In various embodiments, an aircraft dolly of the present disclosure can be used to quickly and safely transport an aircraft disabled by a landing gear failure, such as a flat tire. Certain embodiments are suitable for manual use, as well as for implementation with motorized tugs. The towbars are optional, such that some units can be specified without. The detachability of the towbar further enables compact stowage of the dolly, frees up the towbar for other uses, including interchangeability among dollies.

Existing devices do not offer the advantageous combination of features offered by the present disclosure. The device of Winters, for example, employs a split cradle that can be positioned in the front and rear of a deflated tire. The cradle is actuated by a hand-operated hydraulic pump, which action elevates the tire off the ground, enabling the aircraft to be rolled on the wheels of the device. The cradle design of the Winters device requires clear access to the bottom and much of the lower circumference of the tire, which are not be available on many aircraft that include wheel fairings, especially when the tire in question is flat. The device of Winters could either damage the fairing, or require its removal, which would unduly slow the transport operation. Furthermore, the Winters device uses a complicated mechanical and hydraulic system that is both clumsy and time consuming to use, and is expensive to manufacture.

The Brackett Aircraft device features a wide "pan" for accepting the wheel does little to laterally stabilize the captured wheel. The Brackett Aircraft device also features an integral towbar, which makes it clumsy for quick and simple application and transport. Moreover, with its size and weight, the Brackett Aircraft device generally requires use with a motorized tug, both for placement and transport, and its use on main landing gear wheels requires a second operator to steer the device during transport.

Structurally, for the present disclosure, a hand operated dolly is disclosed in one embodiment for positioning under a landing gear of an aircraft for transporting an aircraft, comprising a frame including a pair of beams that are substantially parallel to each other, the pair of beams being separated by a platform, the pair of beams including walls that extend upward from the platform, the platform and pair of beams defining a channel for insertion of an aircraft tire. A plurality of casters is attached to the pair of beams, and a detachable towbar can be selectively attachable to the frame. A winch can be attached to the frame, the winch including a strap, the strap being attachable to an aircraft or an aircraft tire for translation of the tire onto the channel of the dolly by actuation of the winch for transporting the wheels of the dolly without rolling the aircraft tire. The plurality of lateral beams can be integral with the platform. The platform can also include a lead-in. In one embodiment, the winch is a hand operated winch. The platform can include a fixed stop coupled to the frame, and can also include a plurality of locations for mounting an adjustable stop. The casters can be fixed casters, freely rotatable casters, or a mix thereof. The pair of beams can include structure for selectively mounting the detachable tow bar to a first end of the channel and a second end of the channel, the second end being opposite the first end.

In one embodiment, each of the pair of beams is an angle structure, a first flange of each angle structure extending upward from the platform, a second flange of each angle structure extending laterally away from the platform. The casters are mounted to the second flange and are adjacent the first flange.

In various embodiments, a method of transporting an aircraft is disclosed, the method comprising:
providing a dolly including a frame and a winch attached to the frame, the winch including a strap, the frame defining a channel for insertion of an aircraft tire, the channel including primary flange portions that extend upward from a web portion, the primary flanges defining upper edges having secondary flanges that extend outward from the primary flanges of the channel, the channel being suspended by a plurality of casters coupled to the secondary flanges, the primary flanges including a plurality of apertures formed therein, the apertures defining a pattern, the pattern of a first of the primary flange portions being a mirror image of the pattern of a second of the primary flange portions, each aperture on the first of the primary flange portions being aligned with a corresponding aperture on the second of the primary flange portions to form a plurality of corresponding aperture pairs;
providing at least one adjustable stop configured for insertion through one of the corresponding aperture pairs;
providing instructions on a tangible medium, the instructions including:
  manually pushing the dolly so that the channel is in substantial alignment with a rolling direction of a tire on an aircraft;
  coupling the strap to the aircraft;
  pulling the tire into the channel with the strap using the winch; and
  inserting the at least one adjustable stop through the one of the corresponding aperture pairs to capture the tire within the channel.

The method can further comprise providing a detachable towbar selectively attachable to the frame, wherein the instructions further comprise attaching the detachable towbar to one of the pair of corresponding apertures after the step of pulling. In one embodiment, the step in the instructions of coupling the strap to the aircraft includes wrapping the strap tangentially around a portion of the tire. In one embodiment, the one of the corresponding aperture pairs utilized in the step of inserting is selected for low clearance to accommodate a fairing.

Embodiments of the invention can be used with a variety of aircraft and vehicle types and can be formed of various sizes and materials. Various changes and modifications will be apparent to those of ordinary skill upon reading this disclosure, all without departing from the spirit and scope of the disclosure. Accordingly, this summary, the drawings, and the detailed description are to be regarded as illustrative in nature and not restrictive.

DETAILED DESCRIPTION

Figure 1:
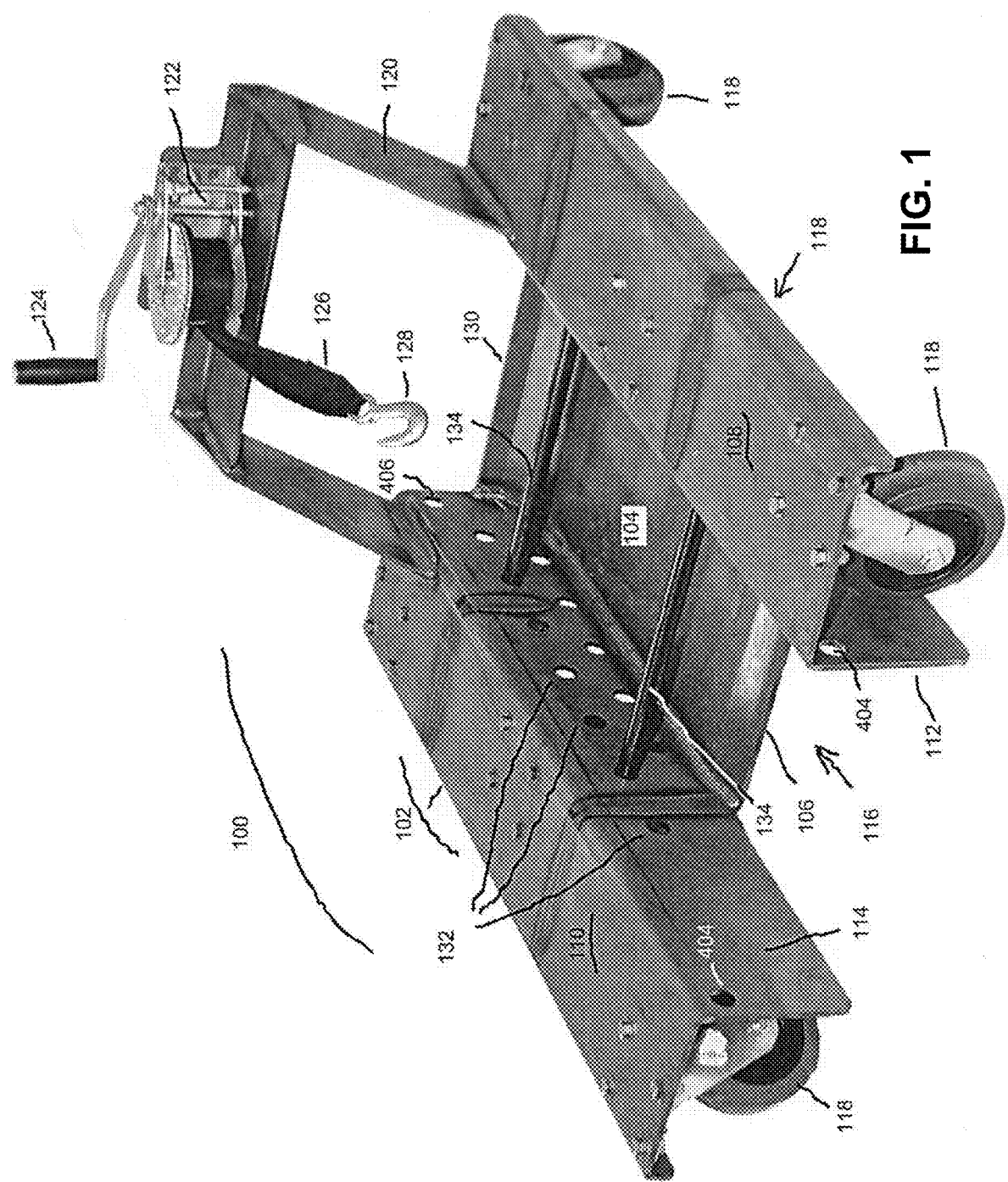
FIG. 1 is a perspective view from the front side in an embodiment of the disclosure.

Referring to FIG. 1, a dolly 100 is depicted in an embodiment of the disclosure. In this embodiment, dolly 100 includes a frame 102 comprised of formed and welded metal plate. Frame 102 includes a platform 104 with a lead-in 106. Frame 102 can also include a right beam 108 and a left beam 110, which can be mirror images of each other. Beams 108 and 110 include right wall 112 and left wall 114, respectively. Right and left walls, 112 and 114, together with platform 104 form a channel 116. Caster wheels 118 are attached to beams 108 and 110. In this embodiment six caster wheels 118 are shown, but any number suitable for stability and load carrying capability may be used. Also in this embodiment, caster wheels 118 are swivel-type casters, allowing dolly 100 to roll in any direction on wheels 118. Alternate embodiments wherein certain wheels 118 are of fixed-direction can also be utilized.

In one embodiment, frame 102 includes a winch bracket 120, onto which a winch 122 is mounted. Winch 122 can be, as shown in this embodiment, a hand crank-operated, geared and ratcheting version with a webbing strap wound on its drum. Other types of winches, such as cable winches, motorized winches, lever winches, and so on can be used in other embodiments. Winch 122 has a handle 124 for winding up a webbing strap 126 onto the drum of winch 122. Webbing strap 126 terminates with a hook 128. Hook 128 can be metal and can optionally include a spring-loaded retaining clip.

Platform 104 can optionally include an upstanding fence, fixed stop 130. While fixed stop 130 can be integral with platform 104, any structure creating a blocking fence or stop or other structure performing the stop function of preventing a tire from overshooting its position can be employed. Right wall 112 and left wall 114 can include a plurality of holes 132. These holes 132 provide for a variety of locations for one or more adjustable stops 134. Adjustable stops 134 are depicted, in this embodiment, as bars having a circular cross-section to align with and fit through pairs of holes 132. Alternate cross-sections, methods of construction, attachment, and adjustment can be used to create suitable tire stops in the forward, reverse, or both directions.

Figure 2:
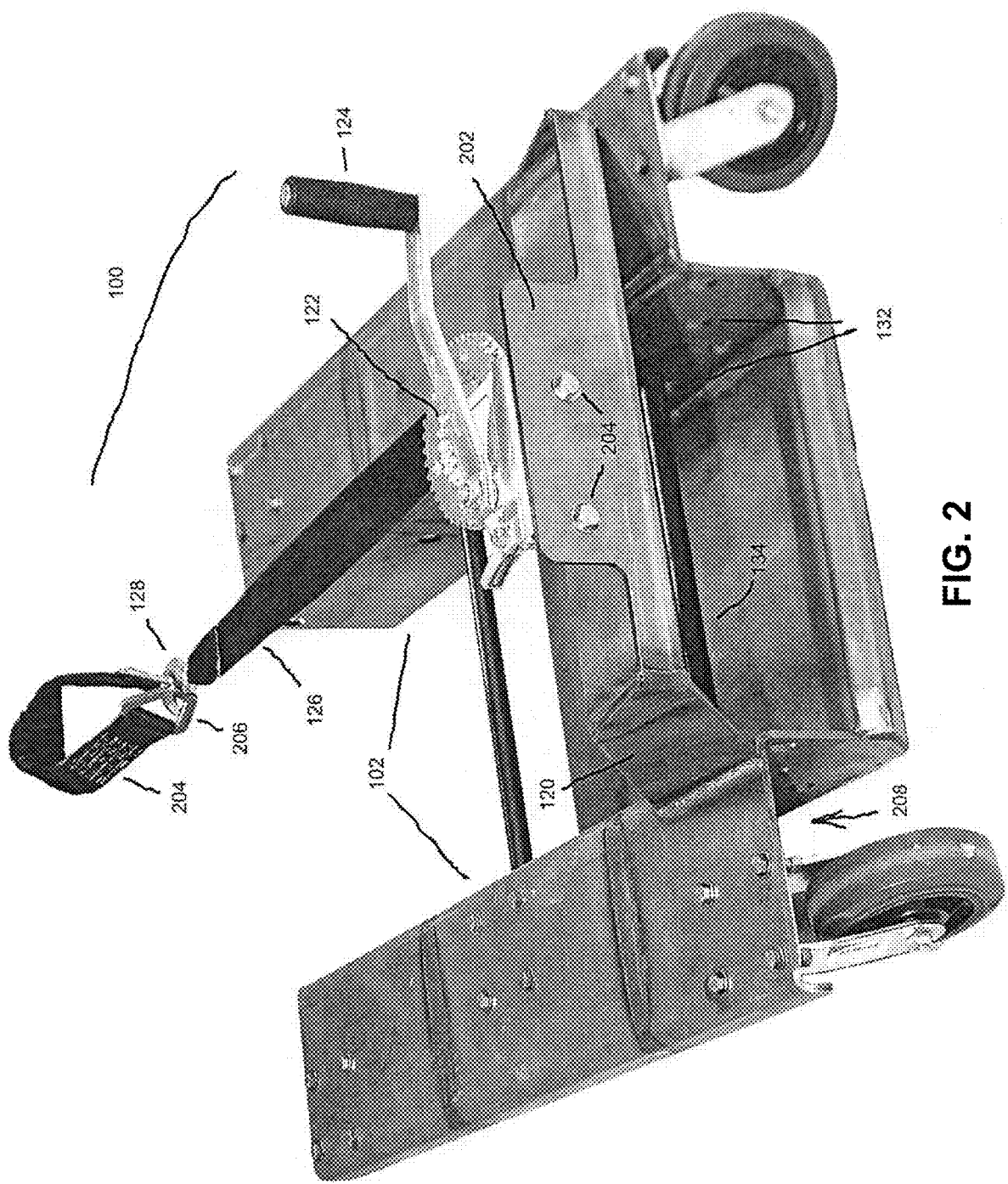
FIG. 2 is a perspective view from the rear side in an embodiment of the disclosure.
Figure 2A:
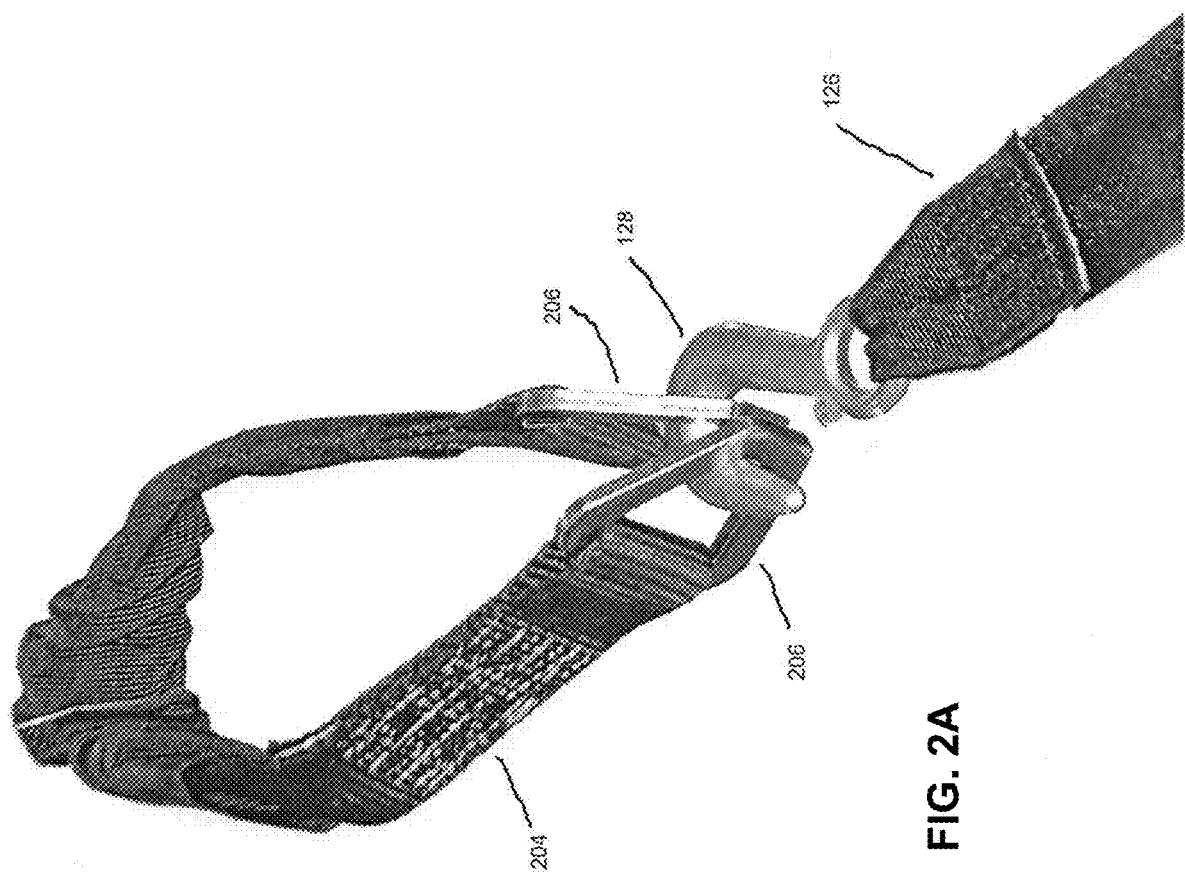
FIG. 2A is a perspective view depicting a webbing band and webbing strap in an embodiment of the disclosure.

Referring to FIG. 2, a rear view of the dolly 100 is depicted in an embodiment of the disclosure. ("Front" and "rear" are used throughout this disclosure for convenience of orientation only, and do not constitute structural or functional definitions or restrictions.) Winch bracket 120 includes a flange 202, which in turn includes mounting holes 204. Winch 122 is affixed to flange 202, and thus to winch bracket 120 and to frame 102, with any suitable fastening method, this embodiment showing threaded fasteners assembled through mounting holes 204. Dolly 100 may include webbing band 204, which includes D-rings 206 affixed to each end. Webbing band 204 removably attaches to hook 128 of webbing strap 126 by hooking D-rings 206 onto hook 128 (FIG. 2A). Adjustable stop 134 is affixed into holes 132 on either end by lock pins 208. Alternate methods of holding adjustable stops 134 in place may be employed, examples including but not limited to quick-release buttons, c-rings, shaft collars, and spring pins.

Figure 3:
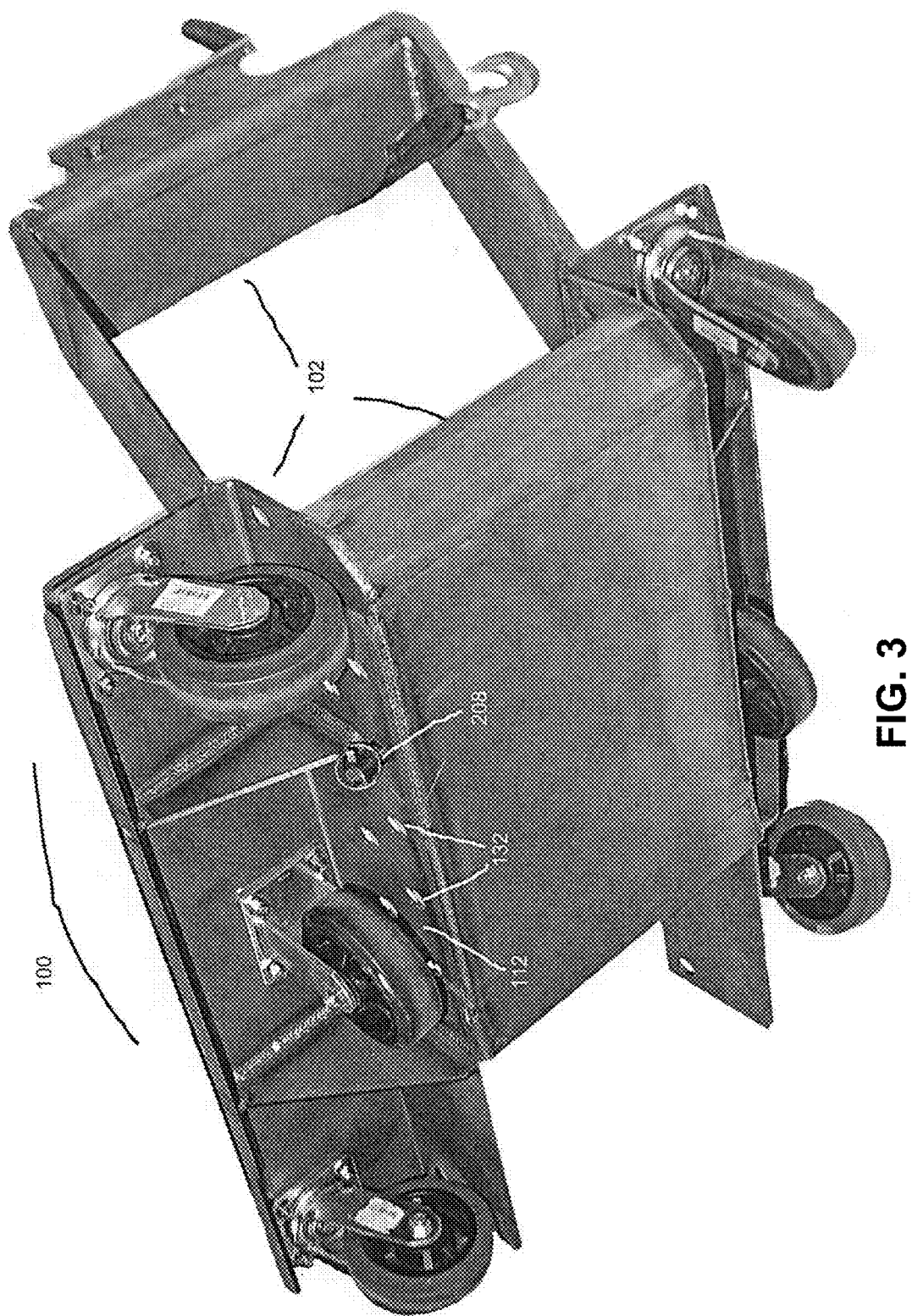
FIG. 3 is a perspective view from the rear side showing the bottom in an embodiment of the disclosure.

Referring to FIG. 3, lock pin 208, holes 132, and right wall 112 of frame 102 are depicted from beneath dolly 100 in an embodiment of the disclosure.

Figure 4:
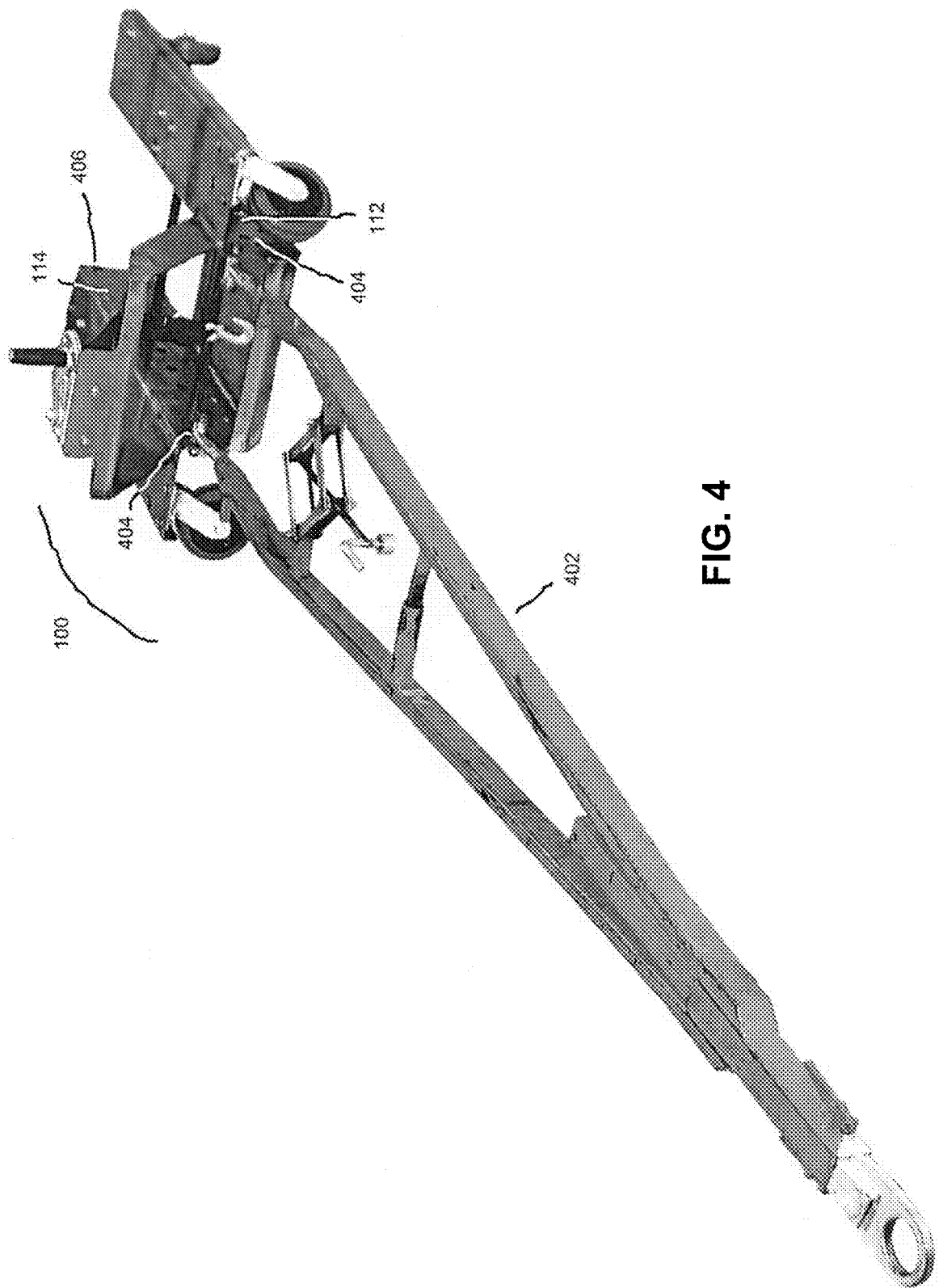
FIG. 4 is a perspective view depicting a towbar attached in an embodiment of the disclosure.

Referring to FIG. 4, towbar 402 is depicted as removably attached in an embodiment of the disclosure. In this embodiment, towbar 402 is removably attached to right and left walls, 112 and 114, of frame 102 by insertion into a pair of front towbar holes 404. Towbar 402 can be of conventional design, and may be suitable for either hand or tug operations. These towbars are commonly attached to aircraft in the same manner as that with which towbar 402 is depicted as attached to dolly 100. Alternately, towbar 402 can be attached to the rear of dolly 100 via rear towbar holes 406 (only one shown), which are part of right and left walls, 112 and 114.

Figure 5:
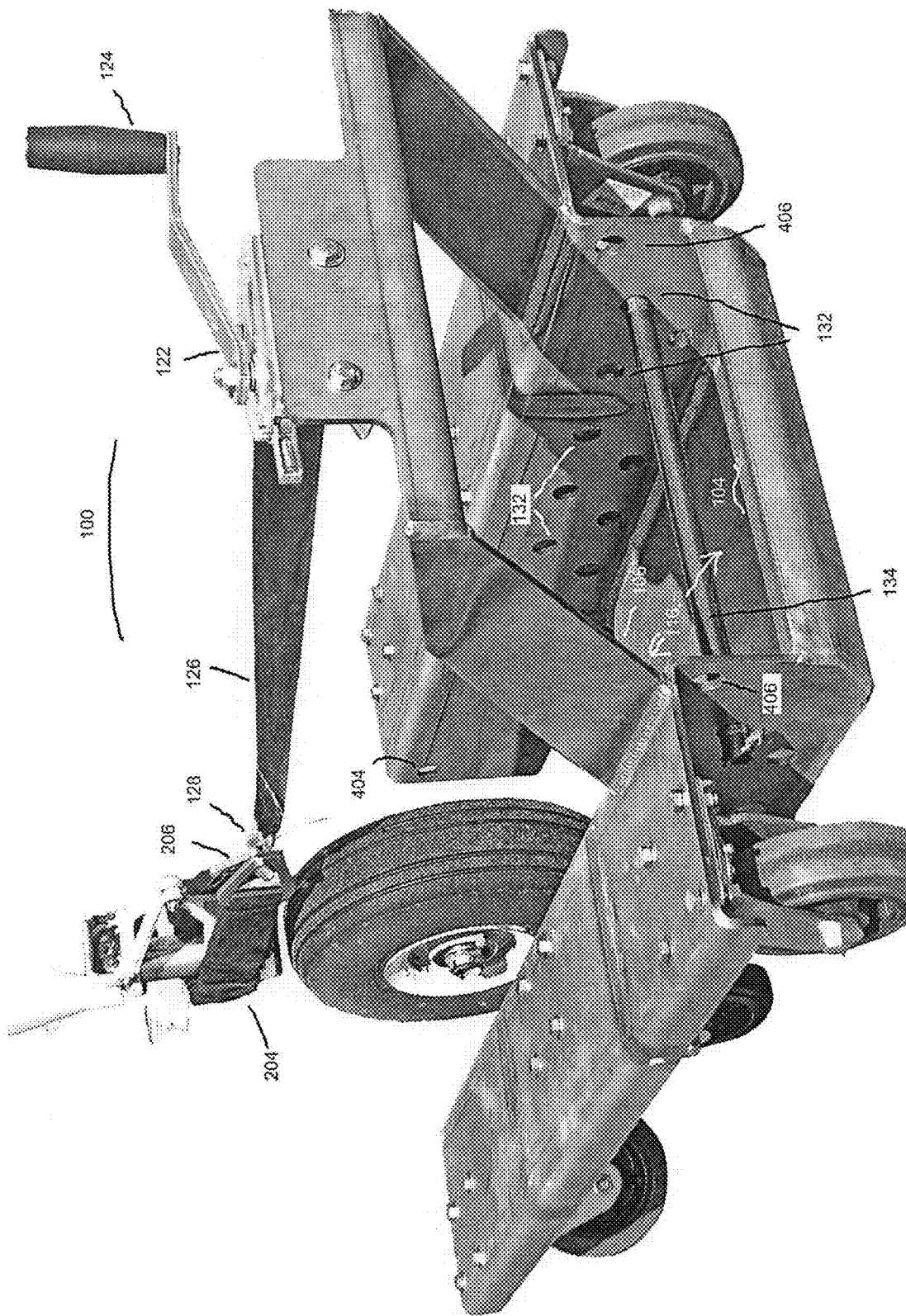
FIG. 5 is a perspective view depicting an aircraft wheel in position to be winched into place in an embodiment of the disclosure.

Referring to FIG. 5, operation of dolly 100 is depicted in an embodiment of the disclosure. In the depiction, dolly 100 has been positioned adjacent to and in line with an aircraft gear tire such that lead-in 106 of platform 104 abuts or nearly abuts the tire of the aircraft. The tire can be normally inflated, flat, or anywhere in between. Although one intended purpose for dolly 100 is for dealing with flat tires, an inflated tire is depicted for illustrative convenience (as in other figures). Furthermore, for convenience and clarity, the tire and wheel are depicted sans fairing (as in other figures). Dolly 100 is configured to accommodate aircraft either with fairings, as are many fixed-gear aircraft, or without fairings, as are many retractable-gear aircraft.

Webbing strap 126 is suitably extended by an operator by unwinding winch 122. The operator wraps webbing band 204 around the strut of the aircraft landing gear, then connects webbing band 204 to webbing strap 126 by mating D-rings 206 to hook 128. The rigging is snugged up during this attachment operation by rotating handle 124 of winch 122. If necessary, the operator will have positioned one adjustable stop 134 in a suitable rear location for that particular aircraft and gear. The plurality of holes 132 allow for a wide accommodation of aircraft types, including those with or without fairings. For example, with a flat tire on a faired aircraft, a lower pair of holes 132 may be selected. In this case stability is not sacrificed because the wheel, being flat, is disinclined to roll over any applied stops. In one embodiment, the operator also will have temporarily removed the front adjustable stop (not shown) to facilitate access to platform 104. The operator may then rotate winch handle 124, which action draws dolly 100 and the aircraft tire together, allowing the tire to mount platform 104 over lead-in 106 and, further, entering channel 116.

Figure 6:
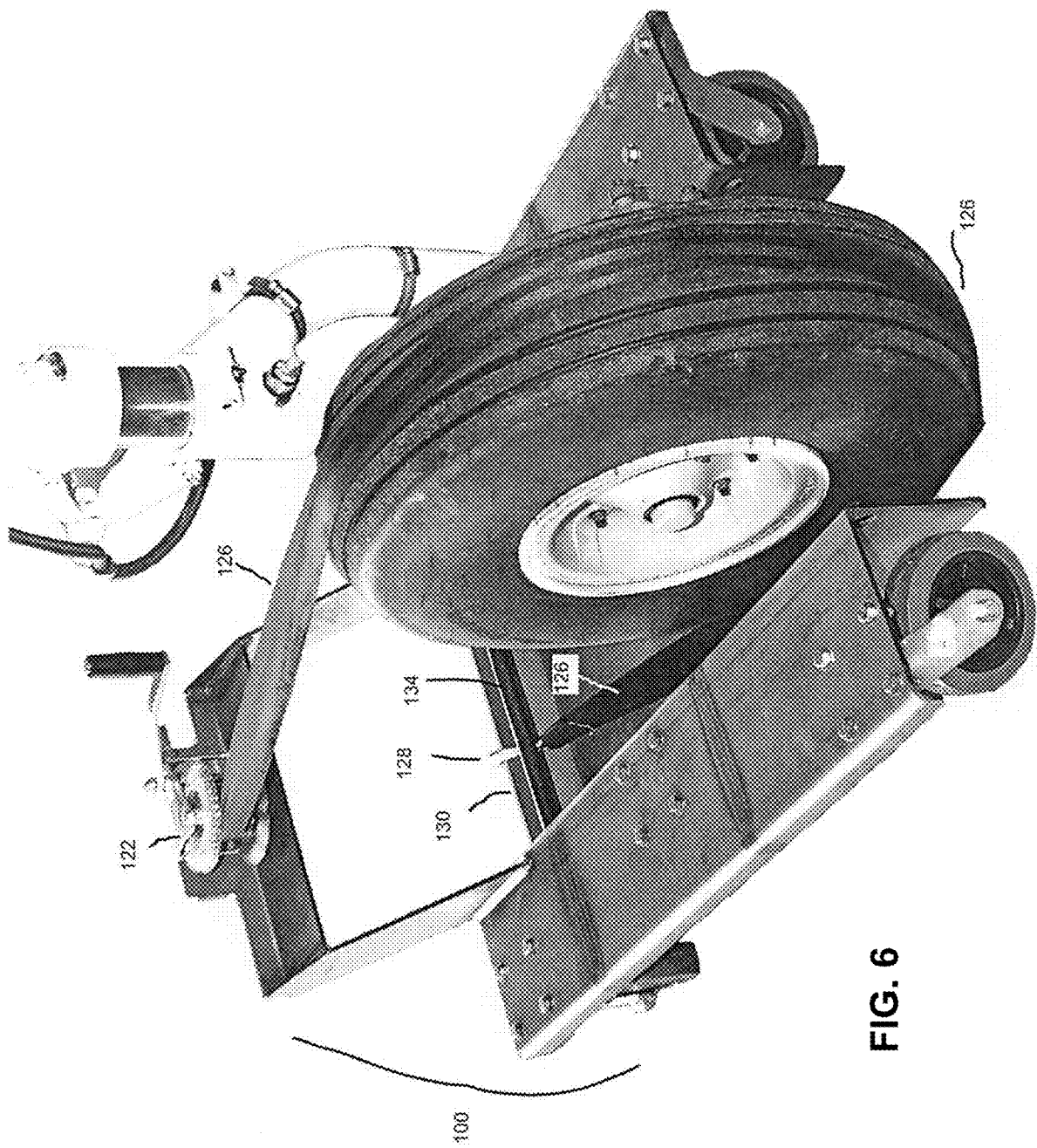
FIG. 6 is a perspective view depicting an alternate rigging method for winching an aircraft wheel into place in an embodiment of the disclosure.

Referring to FIG. 6, an alternate method of use is depicted in an embodiment of the disclosure. In this method, webbing strap 126 is wrapped onto the circumference of the aircraft tire during the rigging process. Hook 128 is attached either to fixed stop 130 or adjustable stop 134. This configuration converts the aircraft wheel into a movable pulley, which offers a mechanical advantage to the winching operation. This method is useful for heavier loads, such as with larger aircraft. Additionally, embodiments of the invention contemplate wrapping the strap transversely to the circumference of the tire and around the sides of the wheel.

Figure 7:
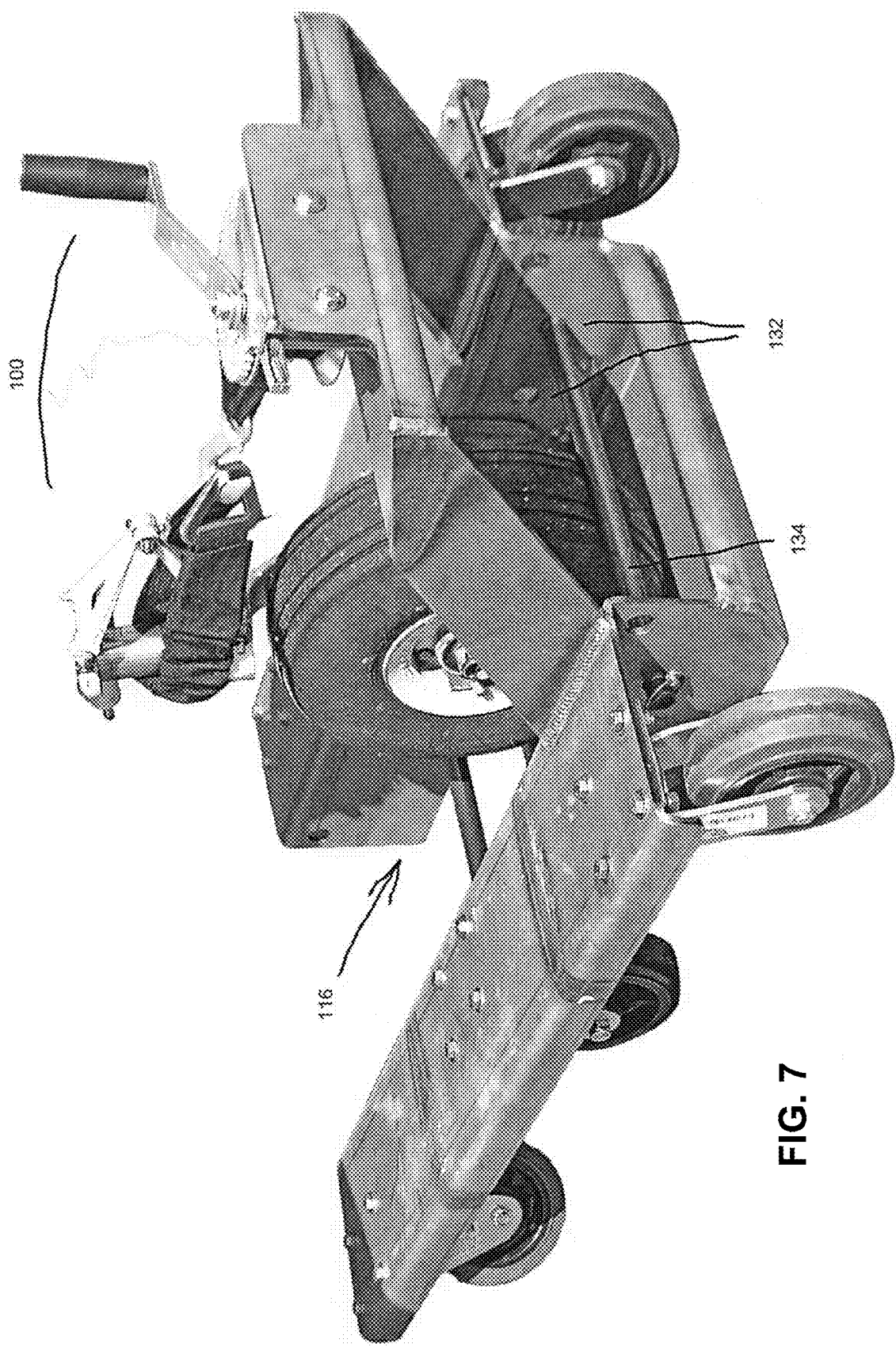
FIG. 7 is a perspective view from the rear side depicting an aircraft wheel in proper position for transport in an embodiment of the disclosure.
Figure 8:
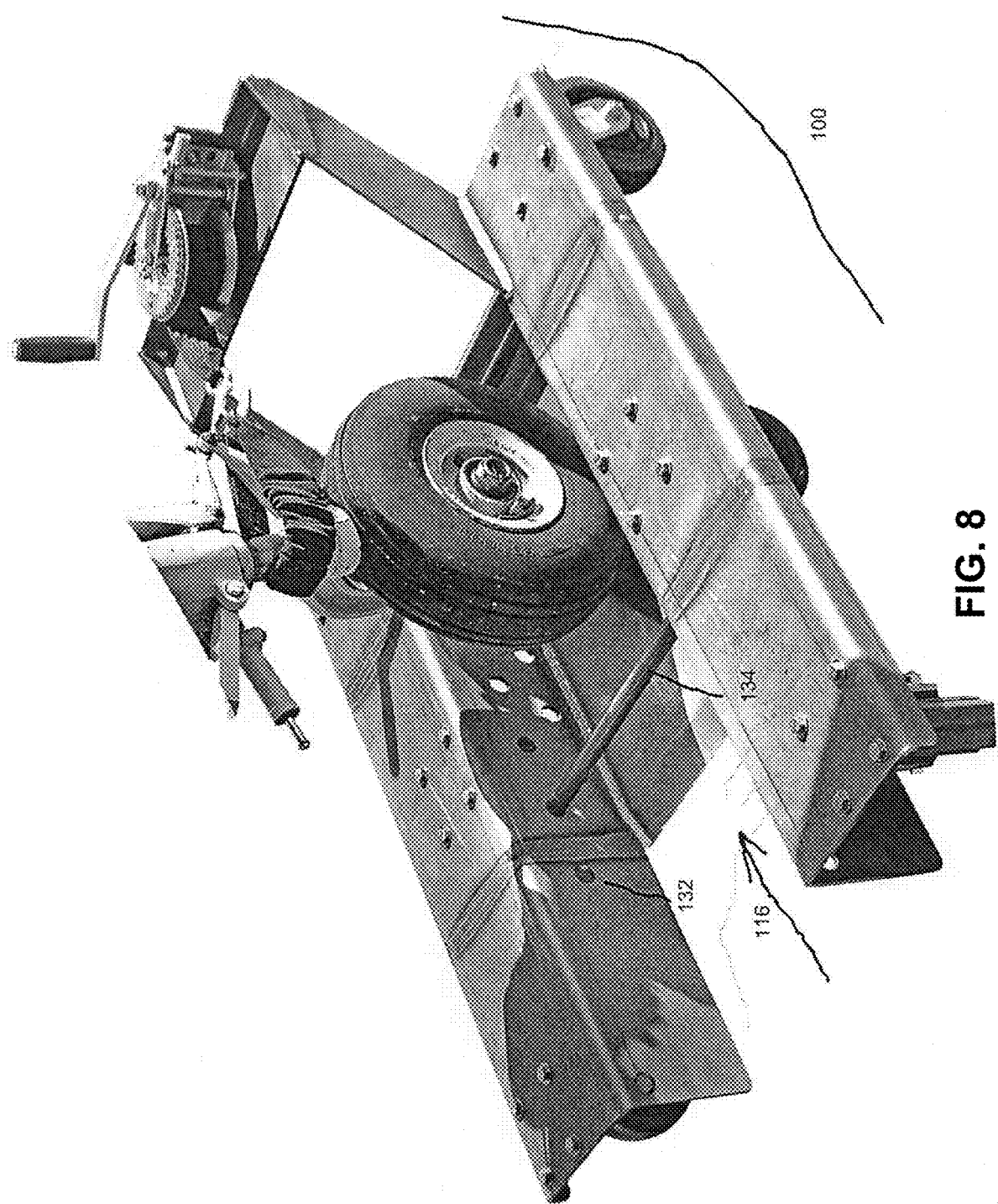
FIG. 8 is a perspective view from the front side depicting an aircraft wheel in proper position for transport in an embodiment of the disclosure.
Figure 9:
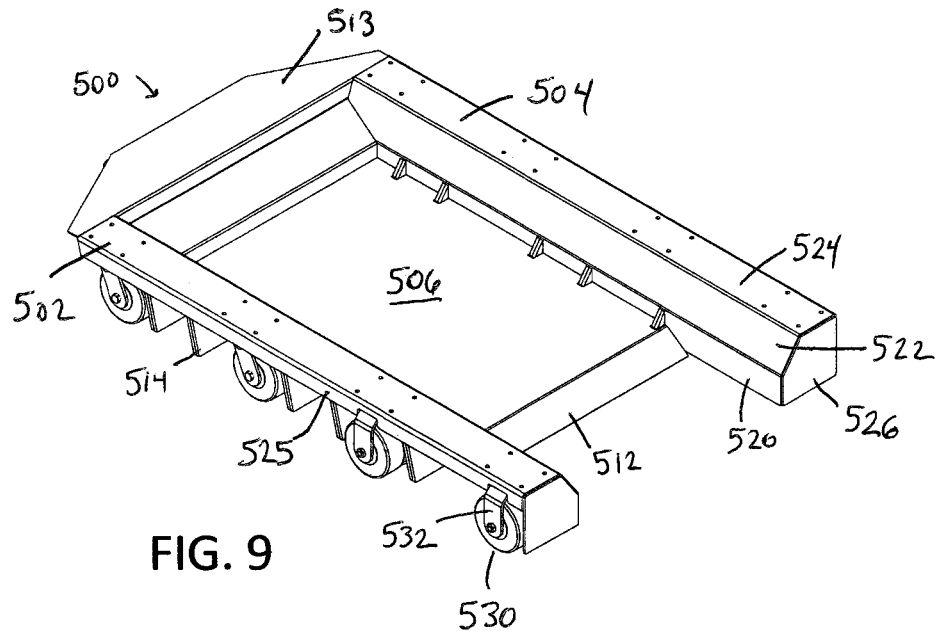
FIG. 9 is a perspective view of another embodiment according to the disclosure.
Figure 10:
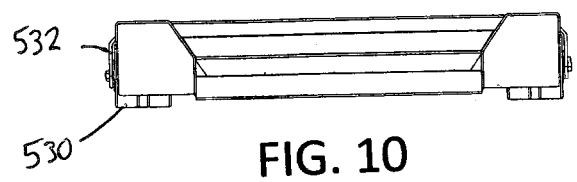
FIG. 10 is an end view of the FIG. 9 embodiment.
Figure 11:
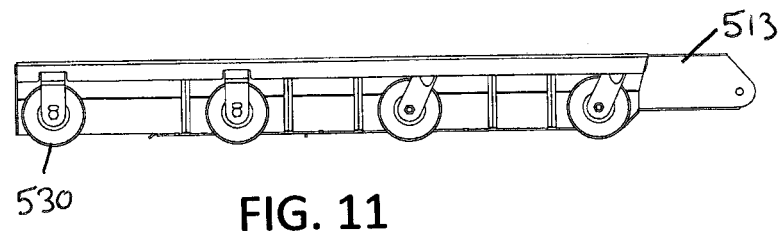
FIG. 11 is a side view of the FIG. 9 embodiment.
Figure 12:
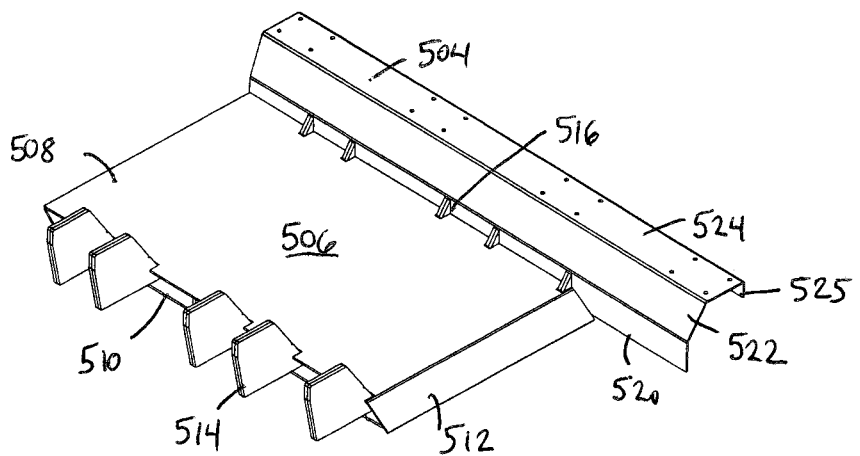
FIG. 12 is a partial perspective view similar to FIG. 9 but with certain features omitted for illustration purposes.
Figure 13:
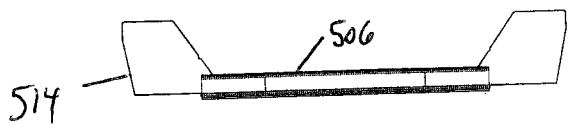
FIG. 13 is a partial end view corresponding to FIG. 12.
Figure 14:
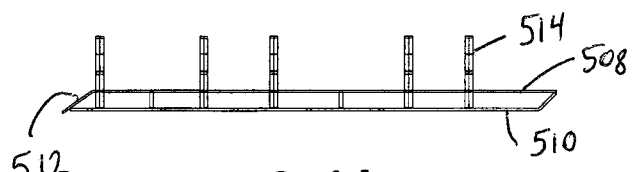
FIG. 14 is a partial side view corresponding to FIG. 12.

Referring to FIGS. 7 and 8, dolly 100 is positioned under an aircraft tire after having been winched into place. The tire is positioned and retained in channel 116. If needed, the operator can attach adjustable stop 134 in a suitable place (by choosing a pair of holes 132) to securely lock dolly 100 under the aircraft tire. The aircraft may now be transported in any desirable way suitable for the prevailing conditions and intended purpose. If desired, towbar 402 (FIG. 4) can be attached to dolly 100 as previously described, with which the aircraft can be towed manually or by tug. Towbar 402 most typically would be employed if dolly 100 is applied to the nose or tail gear of an aircraft. If applied to an aircraft's main gear, a suitable towbar can be attached to the nose or tail gear, in which case dolly 100 will freewheel. Regardless of location of dolly 100, including in multiple locations on one aircraft, the aircraft can be transported by hand pushing as well.

Dolly 100 can be removed from beneath the aircraft tire by removing the winch rigging and the front adjustable stop, then simply rolling the airplane back onto the ground. Alternatively, the aircraft can be jacked up to allow dolly 100 to be rolled out from under the tire.

FIGS. 9-14 illustrate an embodiment useable with heavier aircraft. Many of the features of this embodiment are similar or identical in structure or function to those of the embodiment shown in FIGS. 1-8, and to simplify the disclosure their description will not be repeated. Dolly 500 includes a frame having two longitudinally extending beams 502, 504 and platform 506 extending laterally between them. To increase the amount of weight that can be supported by dolly 500, platform 506 includes two layers or plates 508, 510, disposed one over the other. Lead-in ramp 512 is disposed to guide an aircraft tire from the underlying surface up onto upper plate 508. At the opposite end of ramp 512, support 513 is provided to support a winch bracket for a winch in the manner described previously, and/or to provide a towbar attachment point shown as an aperture at the righthand side of FIG. 11.

Dolly 500 additionally includes a plurality of angled brackets 514 extending on opposite lateral sides of platform 506 to support plates 508, 510 one above the other. Portions 516 of brackets 514 are visible in the partial perspective view of FIG. 12, which for purposes of illustration eliminates beam 502 and support 513. Each beam 502, 504 includes substantially vertical portion 520 extending upwardly from platform 506, angled portion 522 extending from portion 520 over to top portion 524, and outer portion 525. Portions 522 can be provided with apertures for receiving adjustable stops, in the manner of the previous embodiment. End plates 526 substantially close off the ends of beams 502, 504.

Dolly 500 includes a plurality of wheels 530 or casters disposed at each side of the platform for rolling dolly 500 on an underlying surface. Angled brackets 514 are disposed at each side of platform 506 between wheels 530. Outer portion 525 includes slots for accommodating wheel flanges 532 for attaching wheels 530 to beams 502, 504. As shown, dolly 500 includes an increased number of wheels or casters relative to dolly 100; in this case dolly 500 includes eight wheels, four on each side. The wheels can be pivoting wheels (about a vertical axis, for example) or fixed wheels as may be desired for particular applications.

Embodiments of the invention are sturdy and durable, being constructed for example of 5/16 inch or 5/8 inch or greater steel, welded solidly together. In the case of pivoting wheels or casters, it can be desirable to ensure that all casters disposed at the corners of the dolly, at least, are pointed in the direction of the tow before towing begins, to avoid binding or undue stress on the casters. It also can be desirable for enhanced stability to leave the towbar attached to the dolly during winching or other movement of the aircraft tire onto the dolly. It will also be appreciated that during such winching or other movement, the aircraft tire may roll with respect to the dolly, the dolly may roll with respect to the tire, or both movements may occur. In any case, relative movement between the dolly and the aircraft tire occurs to move the aircraft tire into the channel and secure the tire on the platform of the dolly, for towing.

The following references are hereby incorporated by reference herein in their entirety, except for express definitions and patent claims contained therein: U.S. Pat. No. 1,248,896 to Olson; U.S. Pat. No. 2,362,981 to Baum; U.S. Pat. No. 2,392,409 to Ray; U.S. Pat. No. 2,608,312 to Day; U.S. Pat. No. 3,583,723 to Nowell, et al.; U.S. Pat. No. 3,586,187 to Wright; U.S. Pat. No. 3,598,259 to Wright; U.S. Pat. No. 3,720,422 to Nelson; U.S. Pat. No. 3,946,886 to Robinson et al.; U.S. Pat. No. 4,690,605 to Coccaro; U.S. Pat. No. 4,854,803 to Coccaro; U.S. Pat. No. 5,071,151 to Irwin; U.S. Pat. No. 7,097,406 to Gang; U.S. Pat. No. 8,475,108 to Hamman; U.S. Patent Application Publication No. 2014/0037409 to Winters; "Towbar Model TY-TB-FTD", The Brackett Aircraft Company, Inc., Kingman, Ariz., USA; and "NFE-4 Aircraft Tug", AIRTUG®, Avon, Ohio, USA.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The above disclosure is related to the detailed technical contents and inventive features thereof. People skilled in this field may proceed with a variety of modifications and replacements based on the disclosures and suggestions of the invention as described without departing from the characteristics thereof. For example, although a plurality of adjustable stops as shown are useable with each of the embodiments, it is additionally or alternatively contemplated to leave the aircraft tightly secured in place with the winch and strap during towing if needed. Although many such modifications and replacements are not fully disclosed in the above description, they have substantially been covered by the spirit and technical theory of the subject invention.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A dolly for positioning under a landing gear of an aircraft for transporting an aircraft, comprising:
    a frame including a pair of beams that are substantially parallel to each other, said pair of beams being separated by a platform, each of said pair of beams including a vertical wall that extends upward from said platform and a horizontal wall extending laterally outward from the respective vertical wall, said platform and pair of beams defining a channel for movement of an aircraft tire into the channel and onto the platform, wherein said platform comprises two horizontal support plates vertically separated from each other, each of the plates attached to the pair of beams, and wherein each of said pair of beams has a plurality of upright brackets below the respective horizontal wall, each of said plurality of brackets extending intermediate the two horizontal support plates;
    a plurality of casters attached to each of said pair of beams; and
    a winch attached to said frame, said winch including a strap, said strap being attachable to an aircraft or an aircraft tire for movement of said tire into the channel and onto the platform by actuation of said winch, such that the aircraft then can be transported by the dolly without rolling the aircraft tire;
    wherein the frame is adapted for selective attachment to a detachable towbar for towing the aircraft.

2. The dolly of claim 1, wherein said pair of beams are integral with said platform.

3. The dolly of claim 1, further comprising an angled lead-in ramp disposed to guide the aircraft tire up onto the platform.

4. The dolly of claim 1, wherein said winch is a hand-operated winch.

5. The dolly of claim 1, further comprising an adjustable tire stop inserted through one of a plurality of aperture pairs located in the respective vertical walls of the pair of beams.

6. The dolly of claim 5, wherein said plurality of aperture pairs are further configured for selectively mounting the detachable tow bar to a first end of said channel or to a second end of said channel, said second end being opposite said first end.

7. The dolly of claim 6, in combination with the detachable tow bar.

8. The dolly of claim 1, further comprising a fixed stop positioned to impede the tire from moving off the platform.

9. The dolly of claim 1, wherein:
the respective horizontal wall of each of said pair of beams extends to a downwardly extending outer portion.

10. The dolly of claim 1, wherein the frame comprises a winch bracket supporting the winch.

11. The dolly of claim 10, wherein the platform is substantially planar; the dolly further comprising an angled lead-in ramp disposed to guide the aircraft tire up onto the platform and an angled fixed stop disposed at an opposite end of the platform as the lead-in ramp to impede the tire from moving off the opposite end of the platform.

12. The dolly of claim 11, wherein the platform, angled fixed stop, and lead-in ramp are integrally formed as one piece.

13. The dolly of claim 1, wherein the plurality of casters attached to each of said pair of beams comprises four casters attached to each respective beam, and wherein the angled brackets are disposed at each side of the platform between pairs of the casters.

14. A dolly for positioning under a landing gear of an aircraft for transporting an aircraft, the dolly comprising:
a frame including a pair of beams that are substantially parallel to each other, said pair of beams being separated by a platform, each of said pair of beams including a wall that extends upwardly from said platform to a wall that extends horizontally, the wall that extends horizontally extends to a downwardly extending outer portion, said platform and pair of beams defining a channel for movement of an aircraft tire into the channel and onto the platform;
each of said pair of beams having a forward castor, a rearward castor, and a castor intermediate the forward castor and the rearward castor; and
wherein said platform comprises two horizontal support plates vertically separated from each other, each of the plates attached to the pair of beams, and wherein each of said pair of beams has a plurality of upright brackets below the respective horizontal wall, each of said plurality of brackets extending intermediate the two horizontal support plates.

15. The dolly of claim 14, wherein said pair of beams each include a plurality of apertures formed in the walls that extend upward from said platform, said plurality of apertures defining a pattern in each of the walls with apertures aligned across the channel to form a plurality of corresponding aperture pairs configured for mounting an adjustable tire stop.

16. The dolly of claim 15, wherein said plurality of corresponding aperture pairs are further configured for selectively mounting a detachable tow bar to a first end of said channel or to a second end of said channel, said second end being opposite said first end.

17. The dolly of claim 16, in combination with the detachable tow bar.

18. The dolly of claim 14, further comprising a forward support extending between and connecting to the two beams, and wherein a winch is attached to the forward support.

\* \* \* \* \*